(12) United States Patent
Fill (10) Patent No.: US 9,901,218 B2
(45) Date of Patent: Feb. 27, 2018

(54) MULTIFUNCTIONAL PORTABLE DRY BAR AND BEVERAGE PREPARATION STATION FOR BOATS

(71) Applicant: Stephen G. Fill, Fort Lauderdale, FL (US)

(72) Inventor: Stephen G. Fill, Fort Lauderdale, FL (US)

( * ) Notice: Subject to any disclaimer, the term of this patent is extended or adjusted under 35 U.S.C. 154(b) by 17 days.

(21) Appl. No.: 14/634,390

(22) Filed: Feb. 27, 2015

(65) Prior Publication Data

US 2015/0245706 A1    Sep. 3, 2015

Related U.S. Application Data

(60) Provisional application No. 61/945,953, filed on Feb. 28, 2014.

(51) Int. Cl.

| A47B 13/16 | (2006.01) |
|---|---|
| A47J 47/00 | (2006.01) |
| A47B 13/08 | (2006.01) |
| B63B 29/04 | (2006.01) |
| F16B 5/06 | (2006.01) |
| F16B 47/00 | (2006.01) |
| A47B 69/00 | (2006.01) |
| F16B 2/00 | (2006.01) |

(52) U.S. Cl.
CPC ............ *A47J 47/005* (2013.01); *A47B 69/00* (2013.01); *F16B 2/00* (2013.01); *F16B 5/0635* (2013.01); *F16B 5/0685* (2013.01)

(58) Field of Classification Search
CPC .......... A47B 69/00; A47J 47/005; F16B 2/00; F16B 5/0635; F16B 5/0685

USPC ...................................... 269/16; 108/25, 26
See application file for complete search history.

(56) References Cited

U.S. PATENT DOCUMENTS

| 2,723,037 | A | * | 11/1955 | Matesic | ................. | A47B 13/16 |
|---|---|---|---|---|---|---|
| | | | | | | 108/44 |
| 2,812,227 | A | * | 11/1957 | Hill | ....................... | A47B 69/00 |
| | | | | | | 297/188.1 |
| 2,946,546 | A | * | 7/1960 | Pokorny | ................ | A01K 97/10 |
| | | | | | | 248/230.5 |
| 3,695,742 | A | * | 10/1972 | Allen | ...................... | A47B 69/00 |
| | | | | | | 108/14 |
| 3,893,569 | A | * | 7/1975 | Hoch | ..................... | A47B 31/06 |
| | | | | | | 108/44 |
| 4,086,859 | A | * | 5/1978 | Dondero | ................ | A47B 11/00 |
| | | | | | | 108/142 |

(Continued)

*Primary Examiner* — Marc Carlson
(74) *Attorney, Agent, or Firm* — Merek Blackmon & Voorhees LLC (57) ABSTRACT

A beverage station includes a tray having holes for supporting containers of various sizes. The largest holes on the outside of the bar are designed to hold larger bottles of liquor or mixers and other non-alcoholic beverages. Each hole can be adjusted down in size using insert reducers to accommodate smaller bottles so they fit snuggly and don't tip over or spill on a rocking boat. This is accomplished by using the different sized inserts to fit different sized liquor and wine bottles or other non-alcoholic mixers. A cutting board or serving tray can be used to support the beverage station. When the bar is in use it sits atop the serving tray and locks into place with small latches on the right, left and front of the serving tray surface.

17 Claims, 6 Drawing Sheets

(56) References Cited

U.S. PATENT DOCUMENTS

| | | | | |
|---|---|---|---|---|
| 4,122,780 A * | 10/1978 | Brickman | A47B 3/02 | 108/25 |
| 4,338,875 A * | 7/1982 | Lisowski | B63B 17/00 | 114/221 R |
| 4,437,714 A * | 3/1984 | Struck | A47B 69/00 | 108/25 |
| 4,729,535 A * | 3/1988 | Frazier | A47J 37/0786 | 126/24 |
| 4,766,621 A * | 8/1988 | Rasor | E04H 15/001 | 114/343 |
| 4,842,350 A * | 6/1989 | Collings | A47B 69/00 | 211/74 |
| 5,007,612 A * | 4/1991 | Manfre | A01K 97/00 | 220/DIG. 9 |
| 5,202,010 A * | 4/1993 | Guzman | G01N 27/44743 | 204/601 |
| 5,419,265 A * | 5/1995 | Zimmerman | B60N 3/002 | 108/25 |
| D361,033 S * | 8/1995 | Van Beveren | D8/396 | |
| 5,584,531 A * | 12/1996 | Bowman | A47D 3/00 | 108/25 |
| 6,126,256 A * | 10/2000 | Doces, II | A47B 81/04 | 211/71.01 |
| 6,283,566 B1 * | 9/2001 | Doces | A47B 81/04 | 211/71.01 |
| 7,114,452 B1 * | 10/2006 | Owen | B63B 17/00 | 108/25 |
| 7,232,099 B1 * | 6/2007 | Wilcox | B63B 25/002 | 248/228.1 |
| 8,220,789 B2 * | 7/2012 | Pourounidis | A47J 47/005 | 206/216 |
| 8,640,894 B1 * | 2/2014 | Cronin | A47B 97/00 | 108/183 |
| 9,247,807 B1 * | 2/2016 | Sanchez | A47B 13/08 | |
| 2002/0129746 A1 * | 9/2002 | Donnelly | A47B 13/16 | 108/25 |
| 2006/0156962 A1 * | 7/2006 | Holt | A47B 37/00 | 108/50.11 |
| 2010/0230419 A1 * | 9/2010 | Joseph | A47G 23/0625 | 220/574 |
| 2011/0209645 A1 * | 9/2011 | Albornoz Pinzon | A47B 13/16 | 108/25 |
| 2012/0048149 A1 * | 3/2012 | Pendleton | A47G 23/0641 | 108/13 |
| 2015/0068433 A1 * | 3/2015 | Nardi | A47B 13/16 | 108/25 |
| 2015/0208634 A1 * | 7/2015 | Box | A01K 97/10 | 108/25 |
| 2015/0238034 A1 * | 8/2015 | Faulk | A47G 23/0633 | 220/737 |

* cited by examiner

MULTIFUNCTIONAL PORTABLE DRY BAR AND BEVERAGE PREPARATION STATION FOR BOATS

RELATED APPLICATIONS

This application is related to and claims the benefit of priority from U.S. Provisional Patent Application Ser. No. 61/945,953 filed Feb. 28, 2014 and that application is incorporated herein by reference in its entirety.

FIELD OF THE INVENTION

The invention relates to a portable receptacle for providing a stable, level, adjustable, temporary and removable station for use as a dry bar and beverage preparation in conjunction with a fillet/serving station for fish and/or food.

BACKGROUND OF THE INVENTION

On boats of all sizes space is at a premium. Many boats have a galley below deck, but it is more convenient to locate a stable, compact, and fixedly mounted beverage station in the open on deck. While there are many cup holder arrangements on the market, these are not actual bar set ups to accommodate larger liquor bottles, garnishes, and mixers. Currently, many boaters use coolers and buckets strewn out around the open decks and cockpits of boats to hold their liquor bottles and mixers. This makes locating your beverage of choice difficult when searching in closed hatches, coolers and buckets. Furthermore, liquor, mixers and beverages of all types are spilled on the deck of rocking boats, and bottles get dirty from fishing or other activities rendering the beverages disorganized and unappetizing. Having a temporary, stable and organized beverage station topside allows for easy visibility and access, so boaters and fishermen can easily find and pour their beverages including liquor bottles, accompanying mixers, non alcoholic beverages, garnishes and other bar accoutrements. It is also important to have a place to mix drinks so they won't spill on a moving boat, or while at the dock, or sandbar, or cruising slowly as slippery decks can cause boaters to slip and fall. It is also important to have a station that is readily removable when the boat will be travelling at high speed or when large waves are expected. In view of the foregoing, it can be seen that there is a need for a new beverage and serving station which provides a secure, stable, compact and removable location for drink preparation that has the ability to be attached and mounted in a variety of locations on a variety of boat types.

OBJECTS AND SUMMARY OF THE INVENTION

It is an object of the invention to provide a portable and removable beverage station that can be used to hold a variety of different sized beverage containers.

Another object of the invention is to provide a beverage station having removable inserts so that openings for holding beverage containers can be adjusted.

Still another object of the invention is to provide a support for the beverage station that can be inserted into a rod holder.

Yet another object of the invention is to provide a beverage station that can be supported by a pipe clamp on either round or square shaped rails.

Yet another object of the invention is to provide a beverage station that can be supported by a cutting board mounted in a rod holder.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention. Other objects, uses and advantages will be apparent from a reading of this description which proceeds with reference to the accompanying drawings forming a part thereof.

In summary, the present invention is designed to have the flexibility to be temporarily mounted and leveled. The beverage station organizes and enhances the party and cocktail experience while on the water by keeping all the cocktail needs in one organized and secure location.

The beverage station includes a tray having holes for supporting containers of various sizes. The largest holes on the outside of the bar are designed to hold larger bottles of liquor or mixers and other non-alcoholic beverages. Each hole can be adjusted down in size using insert reducers to accommodate smaller bottles so they fit snuggly and don't tip over or spill on a rocking boat. This is accomplished by using the different sized inserts to fit different sized liquor and wine bottles or other non-alcoholic mixers. Smaller holes in the center of the bar can be used to hold smaller cans and bottles to be further used as mixers or they can also act as holders for beer bottles and cans of the twelve ounce variety or they can be used as garnish, straw or napkin holders when fit with small plastic cups that act as disposable containers for the aforementioned items. The center and front of the bar can have cup holes. These can be medium sized holes that is designed to hold a cup or glass that a user will drink out of and allows free use of both hands to mix their drink in so it doesn't slide around and spill as opposed to holding the cup in one hand and trying to pour and balance everything else with their other hand. The mix cup hole can also be further reduced in size with an insert to a smaller sized hole to act as a traditional bottle, cup or can holder. Another insert reducer can be placed into the larger holes in the top tray to form a small dicing surface to cut your lemons, limes and other garnishes on in effect creating a mini cutting board surface that can be moved from side to side to accommodate right and left handed users equally.

The beverage station can conveniently be supported by a rod holder insert, a bar clamp or suction cups. In an alternate embodiment, a cutting board/serving tray can be used to support the beverage station. When the bar is in use it sits atop the cutting board/serving tray and locks into place with small latches on the right, left and front of the cutting board/serving tray surface. When you want to use the cutting board/serving tray you simply undo the latches, remove the bar surface and now you can fillet fish, cut bait, or serve food from the newly revealed flat cutting board/serving tray surface.

DETAILED DESCRIPTION OF THE INVENTION

Figure 1:
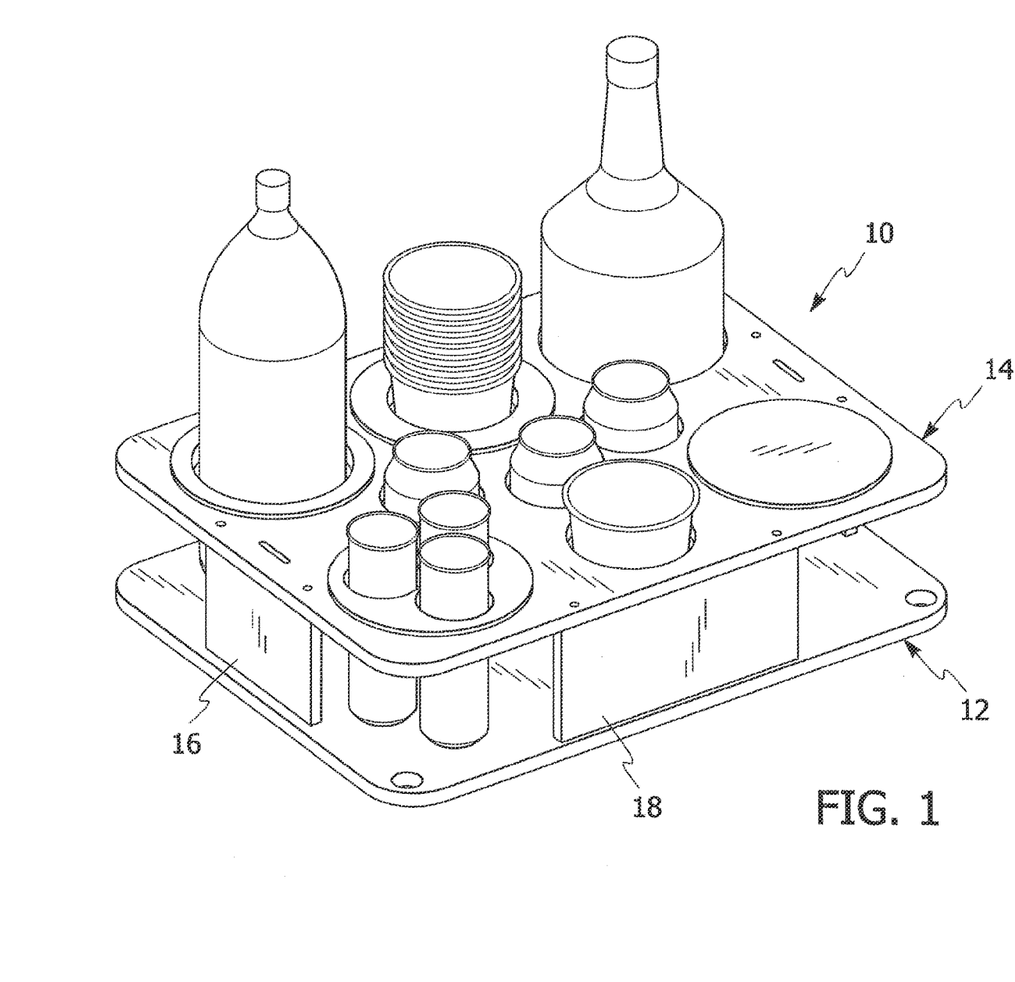
FIG. 1 is a perspective view of the beverage station.

As shown in FIG. 1, the beverage station 10 holding a plurality of beverage containers including cups, bottles and cans.

Figure 2:
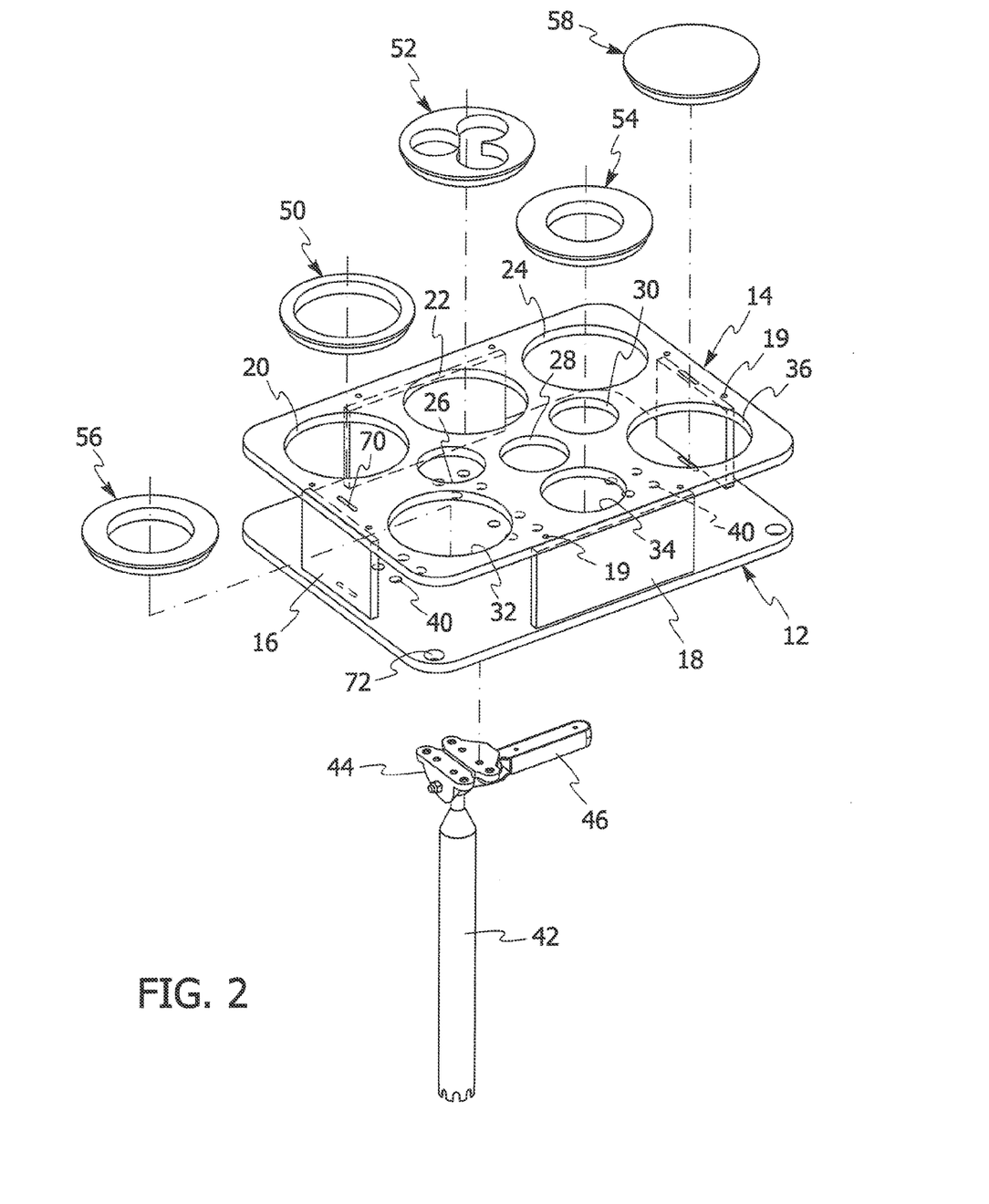
FIG. 2 is a partially exploded view of the beverage station.

Now with reference to FIG. 2, the beverage station 10 includes a bottom 12, a top 14 and front spacers 16 and side spacers 18. Each of the bottom 12, top 14 and spacers 16 and 18 can be made of any strong and rigid material such as wood or plastic or metal. However, since the beverage station 10 is designed to be used in an outdoor marine environment, it is preferable to employ materials that are resistant to water, particularly salt water, as well as resistant to sun and heat. It has been found that wood such as teak or weather resistant plastics such as King Starboard® are suitable for use in manufacturing the beverage station 10.

The top 14 is joined to the bottom 12 by spacers 16 and 18 and are preferably connected by stainless steel screws 19. It should be understood that the top 14, bottom 12 and spacers 16 and 18 could be welded or glued together or they could molded as a single unit such as by injection molding. As an example, typical dimension for the beverage station 10 would be about fourteen inches wide and twenty inches long and about four inches tall. The actual dimensions could vary as desired. Likewise, the thickness of material is preferably three-eighths inch thick and the spacers 16 are preferably three and one-eighth inches tall and three and one-half inches long, whereas the spacers 18 are preferably three and one-eighth inches tall and seven inches long.

The top 14 includes holes or openings 20, 22, 24, 26, 28, 30, 32, 34 and 36 for receiving and retaining beverage containers as shown in FIG. 1. It should be understood that more or less openings could be created as desired. Furthermore, the openings are of various sizes for illustrative purposes, but could be all the same size. The bottom 12 includes attachment holes 40, for connecting the beverage station to a support 42. As shown in FIG. 2, the support 42 is a fishing rod holder mount that can be bolted to the bottom 12. The support preferably includes a swivel supporting head 44 that is bolted to base 12 at holes 40 and includes a locking arm 46.

Reducers 50, 52, 54 and 56 which facilitate changing the size of holes 20, 22, 24 and 32 respectively, are shown in FIG. 2. As shown, the reducers 50, 52, 54 and 56 can change the hole sizes different amounts to accommodate different sizes of beverage containers. In practice, it preferred that the size of reducer used corresponds to the beverage container to prevent tipping of the beverage container when the boat is rocking. A small cutting board 58 can also be fitted into one of the openings such as opening 36 as shown.

Figures 3, 4:
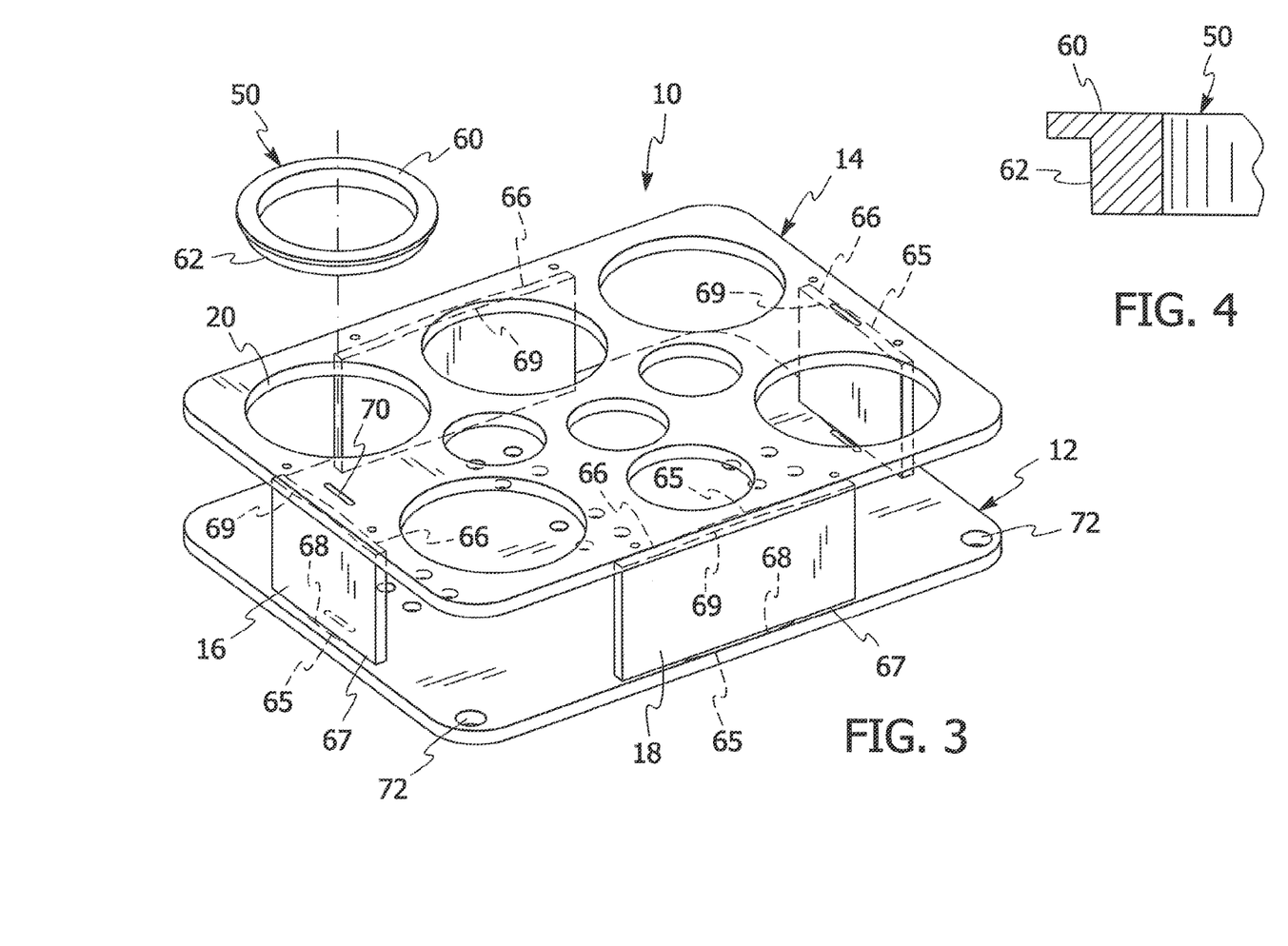
FIG. 3 is another partially exploded view of the beverage station with a single reducer.
FIG. 4 is a cross section of the reducer of FIG. 3 taken along lines 4-4 with portions broken away.

As shown in FIG. 3 and FIG. 4, a reducer 50, for example, includes a flange 60 and preferably a depending wall 62 that is preferably angled to frictionally engage the opening 20. The flange 60 supports the reducer 50 on the top 14 so that the reducer 50 does not slip into the opening 20 and the flange 60 also extends over a portion of the opening 20 to reduce the size of the opening 20. The angled wall 62 preferably frictionally engages the interior wall 64 of the opening 20 so that the reducer 50 does not easily come out when beverage containers are lifted from the beverage station 10 or when the boat is rocking due to waves or movement of people on the boat.

Additionally, as shown in FIG. 3, spacers 16 and 18 may be connected to the bottom 12 and top 14 by a tongue and groove connection where each of spacers 16 and 18 are formed with tongues 65 on their top side edges 66 and bottom side edges 67 which engage with grooves 68 on the bottom 12 and grooves 69 on the top 14. The tongue and groove connection can provide greater stability to the beverage station 10.

Preferably, the beverage station also includes a knife slot 70 and holes 72 for attachment of other accessories including but not limited to bottle openers, hand towel and trash bags.

Figure 5:
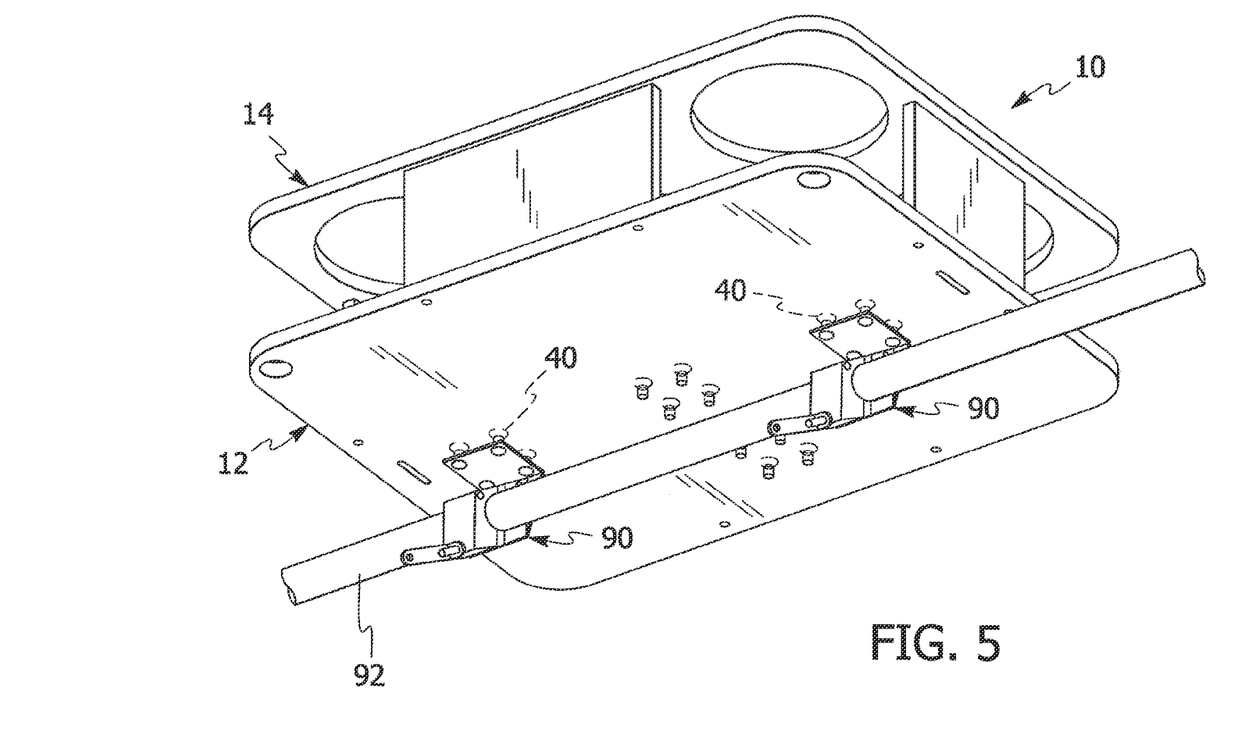
FIG. 5 is a bottom perspective view of the beverage station showing an alternate clamping mechanism.

FIG. 5 illustrates an alternate clamping mechanism 90 which can be bolted to the bottom 12 using holes 40 and can clamp to a rail 92.

Figure 6:
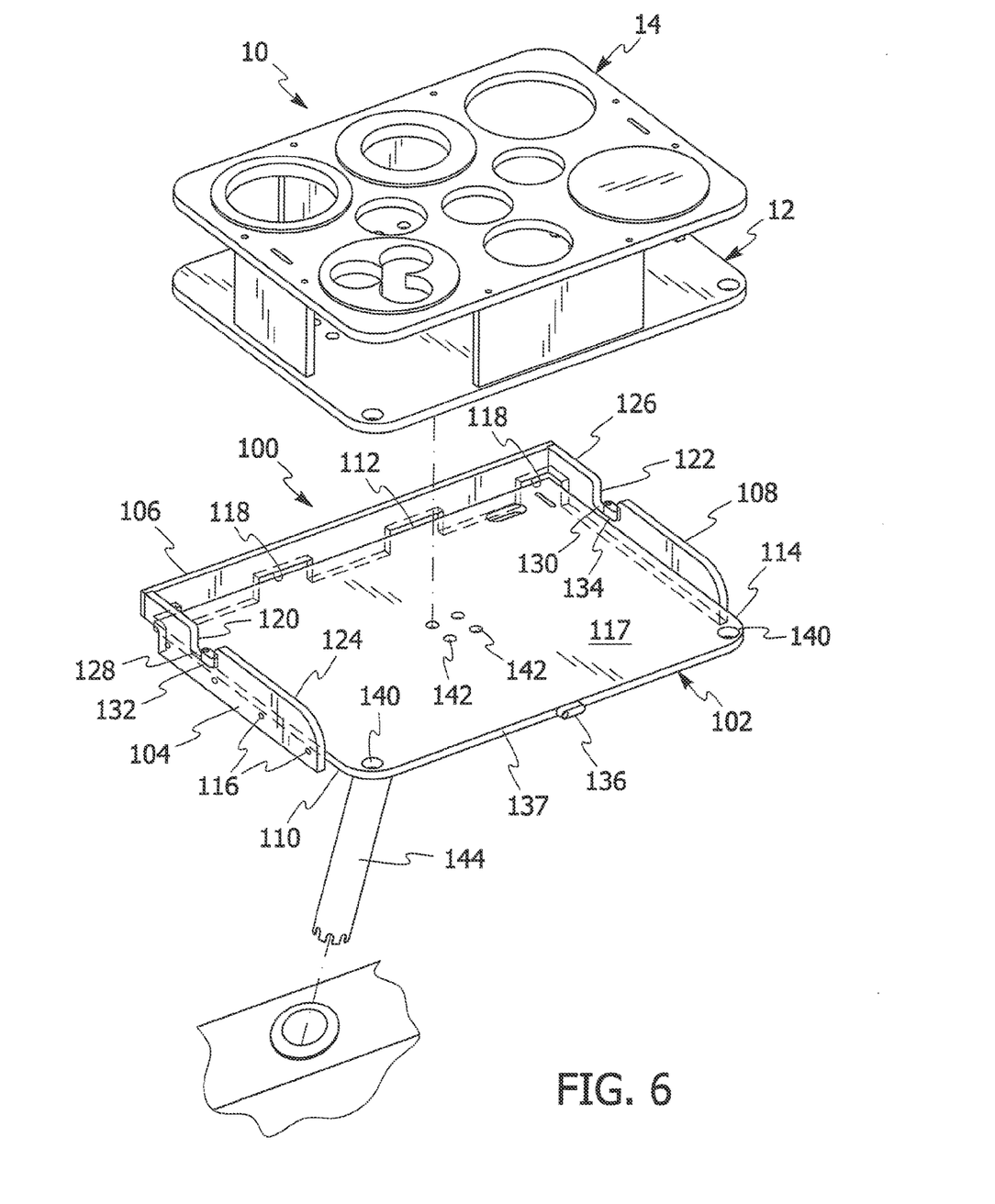
FIG. 6 is an exploded perspective view of a combination cutting board and beverage station.

FIG. 6 shows a cutting board/serving table 100 preferably formed of the same materials as the beverage station 10. The table 100 can be used by itself as a cleaning station for cleaning fish or it can be used a serving table. The table 100 includes a flat base 102 and preferably has side walls 104, 106 and 108 on three sides to prevent items placed thereon from sliding into the water. The walls 104, 106 and 108 may be joined to the edges 110, 112 and 114 of the base 102, respectively by stainless steel screws 116. Alternatively, the walls 104, 106 and 108 may be glued or welded to edges 110, 112 and 114 or the entire table 100 could be molded as a single unit. Preferably, the walls 104, 106 and 108 extend above the surface 117 of the base 102 by an inch, but the height of the walls 104, 106 and 108 may vary as desired. Wall 106 preferably has drain slots 118 formed therein to permit fluids to flow off the surface 117.

The side walls 104 and 108 each include a slot 120 and 122, respectively extending downwardly from their top edges 124 and 126, respectively. The bottoms 128 and 130, respectively of each slot 120 and 122 extend upwardly about the thickness of the bottom 12 of the beverage station 10. Pivoting keepers or swivel pins 132 and 134 are mounted to the each of the bottoms 128 and 130 of the slots 120 and 122. A third pivoting keeper 136 is mounted to a front edge 136 of the base 102 and can be pivoted upwardly for preventing the beverage station 10 from sliding forward.

Figure 7:
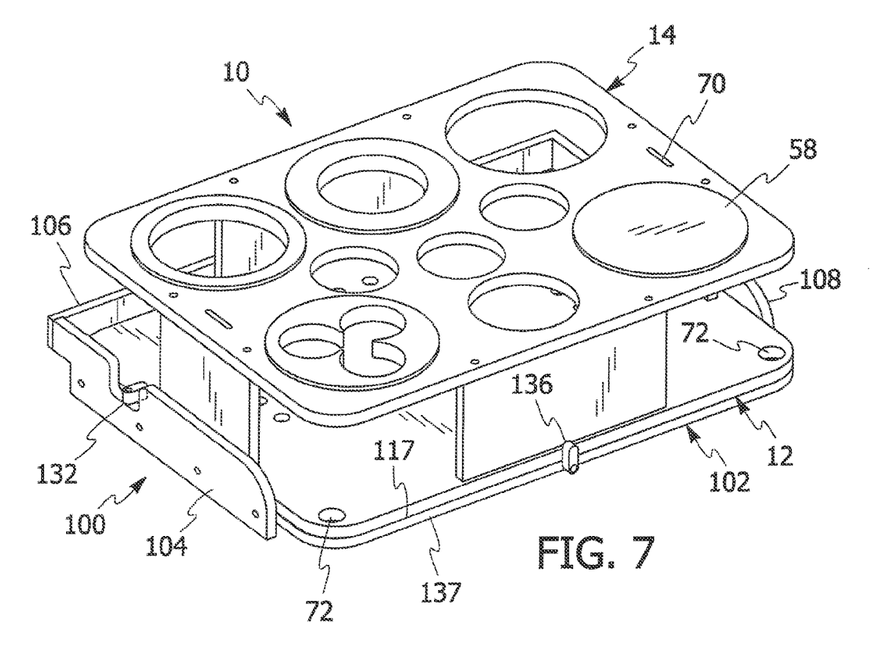
FIG. 7 is a perspective view of the combination of FIG. 6 engaged as a single unit.

Now with reference to FIG. 6 and FIG. 7, the distance between side walls 104 and 108 corresponds to the side to side length of the bottom 12 and the distance between wall 106 and front edge 136 corresponds to the front to back width of bottom 12. As shown in FIG. 7, the beverage station 10 can be placed onto the surface 117 of the table 100 and locked in place by pivoting keepers 132, 134 and 136.

Figure 8:
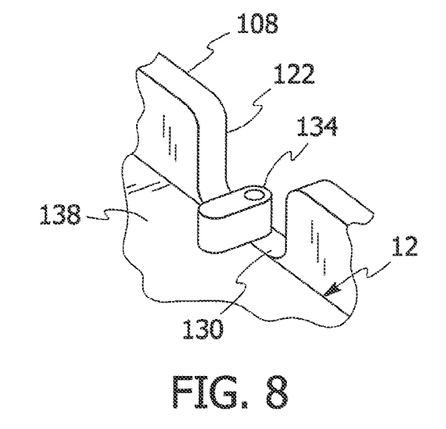
FIG. 8 is an enlarged view of a side locking tab.
Figure 9:
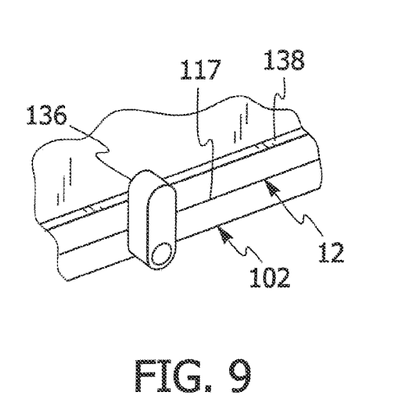
FIG. 9 is an enlarged view of a front locking tab.

FIG. 8 shows a pivoting keeper 134 retaining the bottom 12 of the beverage station 10 from lifting off of the table 100. Pivoting keeper 132 would function in the same way. It is preferable that the pivoting keepers 132 and 134 frictionally engage the surface 138 of the bottom 12 of the beverage station 10 so that the beverage station 10 does not move or bounce relative to the table 100 when the boat rocks. FIG. 9 shows the pivoting keeper 136 retaining the bottom 12 of the beverage station 10 from sliding forward. The beverage station 10 would be prevented from sliding sideways and backward by the walls 104, 106 and 108.

The table 100 includes attachment holes 140 for attachment of other accessories including, but not limited to, bottle openers, hand towel and trash bags. When the beverage station 10 is locked in place on the table 100, attachment holes 72 align with holes 140 so that both sets of holes remain functional.

The table 100 includes attachment holes 142 for connecting the beverage station to a support 144. As shown in FIG. 6, the support 144 is a fishing rod holder mount that can be bolted to the base 102. Furthermore, the table 100 could be mounted to a rail or other surface by a suitable mounting device bolted the table using the attachment holes 142.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

The invention claimed is:

1. A combination cutting board and beverage station comprising;
   a cutting board and a beverage station tray;
      said cutting board comprising;
         a) a first sheet of substantially rigid material having a top surface and a bottom surface;
         b) at least one wall extending upwardly from said top surface of said first sheet;
         c) an attachment device mounted to said bottom surface for securing said first sheet to a boat;
      said beverage station tray comprising;
         d) a base formed of a substantially flat sheet of substantially rigid material;
         e) a top formed of a substantially flat sheet of substantially rigid material having a plurality of openings formed therein for holding beverage containers;
         f) at least one spacer located between said base and said top and connecting said top on said base in a substantially parallel arrangement;
      wherein said base of said beverage station tray is positioned adjacent said at least one wall and removably secured on top of said top surface of said cutting board with at least one pivotable engagement latch.

2. The combination cutting board and beverage station as set forth in claim 1, wherein;
   a) said base of said beverage station tray is positioned abutting said at least one wall.

3. The combination cutting board and beverage station as set forth in claim 1, wherein;
   a) said base and said top having substantially equal width and length; and,
   b) said at least one spacer elevates said top from said base and said at least one spacer are fixedly joined to said base and said top.

4. The combination cutting board and beverage station as set forth in claim 1, further comprising;
   a) a reducer having a top flange that is larger than at least one of said plurality of openings so that said top flange can rest upon a portion of said top that surrounds said at least one of said plurality of openings.

5. The combination cutting board and beverage station as set forth in claim 4, wherein;
   a) said reducer further includes a sidewall that is sized to extend into said at least one of said plurality of openings and frictionally engage an inner perimeter surface of said at least one of said plurality of openings.

6. The combination cutting board and beverage station as set forth in claim 5, wherein;
   a) said sidewall of said reducer is angled so that said sidewall frictionally engages said inner perimeter surface of said at least one of said plurality of openings when said sidewall is inserted in said at least one of said plurality of openings.

7. The combination cutting board and beverage station as set forth in claim 1, wherein;
   a) said attachment device is a fishing rod holder mount.

8. The combination cutting board and beverage station as set forth in claim 7, wherein;
   a) said fishing rod holder mount includes a swivel supporting head and includes a locking arm.

9. The combination cutting board and beverage station as set forth in claim 1, wherein;
   a) said attachment device is a rail mount.

10. The combination cutting board and beverage station as set forth in claim 1, wherein;
    a) said attachment device is at least one suction cup.

11. A combination cutting board and beverage station comprising;
    a cutting board and a beverage station tray;
       said cutting board comprising;
          a) a first sheet of substantially rigid material having a top surface and a bottom surface;
          b) at least one wall extending upwardly from said top surface of said first sheet;
          c) an attachment device mounted to said bottom surface for securing said first sheet to a boat;
       said beverage station tray comprising;
          d) a base formed of a substantially flat sheet of substantially rigid material;
          e) a top formed of a substantially flat sheet of substantially rigid material having a plurality of openings formed therein for holding beverage containers and at least one of said plurality of openings having a removable adjustment ring for reducing the size of said at least one of said plurality of openings for holding smaller diameter beverage containers;
          f) at least one spacer located between said base and said top and connecting said top on said base in a substantially parallel arrangement;
          g) said base having a first set of attachment holes for connecting said base to a single mount support;
          f) said base having a second set of attachment holes and a third set of attachment holes for connecting said base to multiple mount supports wherein said first set of attachment holes is located between said second set of attachment holes and said third set of attachment holes whereby said beverage station tray is compatible with a plurality of mounting arrangements;
       wherein said base of said beverage station is positioned adjacent said at least one wall and removably secured on top of said top surface of said cutting board with at least one pivotable engagement latch.

12. The combination cutting board and beverage station as set forth in claim 11, wherein;
    a) said base of said beverage station tray is positioned abutting said at least one wall.

13. The combination cutting board and beverage station as set forth in claim 11, wherein;
    a) said base and said top having substantially equal width and length; and, b) said at least one spacer elevates said top from said base and said at least one spacer are fixedly joined to said base and said top.

14. The combination cutting board and beverage station as set forth in claim 11, further comprising;
   a) said removable adjustment ring having a top flange that is larger than at least one of said plurality of openings so that said top flange can rest upon a portion of said top that surrounds said at least one of said plurality of openings.

15. The combination cutting board and beverage station as set forth in claim 14, wherein;
   a) said removable adjustment ring further includes a sidewall that is sized to extend into said at least one of said plurality of openings and frictionally engage an inner perimeter surface of said at least one of said plurality of openings.

16. The combination cutting board and beverage station as set forth in claim 11, wherein;
   a) said at least one wall has at least one drain slot opening formed therein.

17. The combination cutting board and beverage station as set forth in claim 11, wherein;
   a) said base includes a plurality of holes located near corners of said base for attachment of accessories.

\* \* \* \* \*